United States Patent
Lee et al.

(10) Patent No.: US 11,505,093 B2
(45) Date of Patent: Nov. 22, 2022

(54) SWING SEAT UNIT

(71) Applicants: Hyundai Motor Company, Seoul (KR); Kia Corporation, Seoul (KR)

(72) Inventors: Yun Jee Lee, Seoul (KR); Ji Hyun Song, Suwon-si (KR); Ran Jeong Park, Hwaseong-si (KR); Seung Chan Jo, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/526,372

(22) Filed: Nov. 15, 2021

(65) Prior Publication Data
US 2022/0324356 A1    Oct. 13, 2022

(30) Foreign Application Priority Data

Apr. 9, 2021  (KR) .......................... 10-2021-0046582

(51) Int. Cl.
*B60N 2/10* (2006.01)
*A47C 7/72* (2006.01)
*A47C 3/025* (2006.01)

(52) U.S. Cl.
CPC .............. *B60N 2/10* (2013.01); *A47C 3/0257* (2013.01); *A47C 7/725* (2013.01); *A47C 7/727* (2018.08)

(58) Field of Classification Search
CPC .......... A47C 7/66; A47C 7/666; A47C 7/727; A47C 7/725; A47C 3/0257; A63G 9/16; B60N 2/12; B60N 2/10
See application file for complete search history.

(56) References Cited

U.S. PATENT DOCUMENTS

| 5,489,142 | A | * | 2/1996 | Mathieu | ................ | G02B 23/16 |
|---|---|---|---|---|---|---|
| | | | | | | 359/430 |
| 8,087,724 | B2 | * | 1/2012 | Kosik | ................ | A47C 3/0257 |
| | | | | | | 297/217.3 |
| 9,603,457 | B2 | * | 3/2017 | Massaud | ................ | A47C 7/70 |
| 2018/0332969 | A1 | * | 11/2018 | Terzini | ................ | A47C 3/0255 |
| 2022/0202186 | A1 | * | 6/2022 | Duncan, III | ......... | A47C 3/0251 |

FOREIGN PATENT DOCUMENTS

| CN | 110432678 A | * | 11/2019 |
|---|---|---|---|
| CN | 111109908 A | * | 5/2020 |
| KR | 10-2235026 B1 | | 4/2021 |

* cited by examiner

*Primary Examiner* — Milton Nelson, Jr.
(74) *Attorney, Agent, or Firm* — Morgan, Lewis & Bockius LLP

(57) ABSTRACT

A swing seat unit may include a seat which is provided on a fixing frame and swings on the fixing frame; a dome frame which is provided to be spaced from a rear of the seat and extends upward to surround the rear of the seat; a hemispherical swing dome which is provided on an upper portion of the dome frame, swingable on the dome frame, and is opened downward toward a predetermined direction; and a second driving portion which is provided between the dome frame and the swing dome to provide power for swing the swing dome.

15 Claims, 7 Drawing Sheets

SWING SEAT UNIT

CROSS-REFERENCE TO RELATED APPLICATION

The present application claims priority to Korean Patent Application No. 10-2021-0046582, filed Apr. 9, 2021, the entire contents of which is incorporated herein for all purposes by this reference.

BACKGROUND OF THE INVENTION

Field of the Invention

The present invention relates to a swing seat unit optimized for autonomous vehicle in which the seat is formed of one piece by reducing a plurality of frames and links forming the seat for easy implementation of a swinging structure and smooth tilting through swing movement, and in which lighting and sound is implemented and personalized through a dome shape.

Description of Related Art

In general, a seat includes a seat cushion and a seat back. Furthermore, the seat cushion and the seat back are connected and controlled with links for seat reclining or tilting. However, conventionally, there is a problem in which a plurality of frames and a link assembly for connecting these frames are excessively required for such a deformation movement of the seat.

Furthermore, in the case of the autonomous vehicle with increased sliding length and rotatable seats, which is being actively studied recently, it is expected that many people board the vehicle together through ride haling or the like. In such a case, it is necessary to simplify the design of the seat, to individually adjust the lighting or sound while each seated on the seat, and to personalize the function of the seat.

However, according to a conventional vehicle seat structure and the structure of the vehicle body, such a personalized and simple structure of the seat cannot be provided. Thus, there is a demand for the development of such a seat.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a swing seat unit optimized for autonomous vehicle in which the seat is formed of one piece by reducing a plurality of frames and links forming the seat for easy implementation of a swinging structure and smooth tilting through swing movement, and in which lighting and sound is implemented and personalized through a dome shape.

To achieve the purpose above, the swing seat unit according to various exemplary embodiments of the present invention includes a fixing frame; a seat which is provided on the fixing frame and swingable on the fixing frame; a first driving portion which is provided between the fixing frame and the seat to provide power for swinging the seat; a dome frame which is provided to be spaced from a rear of the seat and extends upward to surround the rear of the seat; a hemispherical swing dome which is provided on an upper portion of the dome frame, swingable on the dome frame, and is opened downward toward a predetermined direction; and a second driving portion which is provided between the dome frame and the swing dome to provide power for swing the swing dome.

The swing seat unit may be provided on an indoor space floor of a vehicle.

The swing seat unit may further include a control portion that is electrically connected to the first driving portion and the second driving portion and configured to control the first driving portion and the second driving portion together or independently.

The control portion may control the first driving portion and the second driving portion so that an open portion of the swing dome faces forward when the seat is swinging in an erect direction thereof, and the open portion of the swing dome faces downward when the seat is swinging in a lying direction thereof.

At least one of a lighting or a speaker may be provided on an upper portion of the swing dome.

The speaker may be disposed at a position inclined forward from the upper portion of the swing dome and output sound toward an internal space of the swing dome.

The swing dome may be formed with a transparent or translucent plastic material.

A speaker may be built in an upper portion of the swing dome, a dome rail may be formed in front and rear directions on an external surface, and the dome rail may be connected to the second driving portion.

The first driving portion may be provided on the fixing frame, and an arch-shaped rack gear protruding downward may be provided at a lower portion of the seat, and the rack gear may be connected to the first driving portion, so that the seat swings by the first driving portion.

An arch-shaped guide rail may be formed on an outside of the rack gear, and a guide roller may be provided on the fixing frame along a path along which the guide rail slides to guide the sliding of the guide rail.

The second driving portion may be provided on the upper portion of the dome frame, a dome rail extending in front and rear directions may be formed on an upper external surface of the swing dome, and the dome rail may be connected to the second driving portion so that the swing dome swings by the second driving portion.

A dome guide rail may be formed on an upper external surface of the swing dome so that the dome guide rail extends in front and rear directions toward a side of the dome rail, and a dome guide roller may be provided on the dome frame to guide the swinging of the swing dome by being engaged with the dome guide rail.

An upper portion of the seat may be located in an internal space of the swing dome.

According to the swing seat unit of the present invention, it can provide a swing seat unit optimized for autonomous vehicle in which the seat is formed of one piece by reducing a plurality of frames and links forming the seat for easy implementation of a swinging structure and smooth tilting through swing movement, and in which lighting and sound is implemented and personalized through a dome shape.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
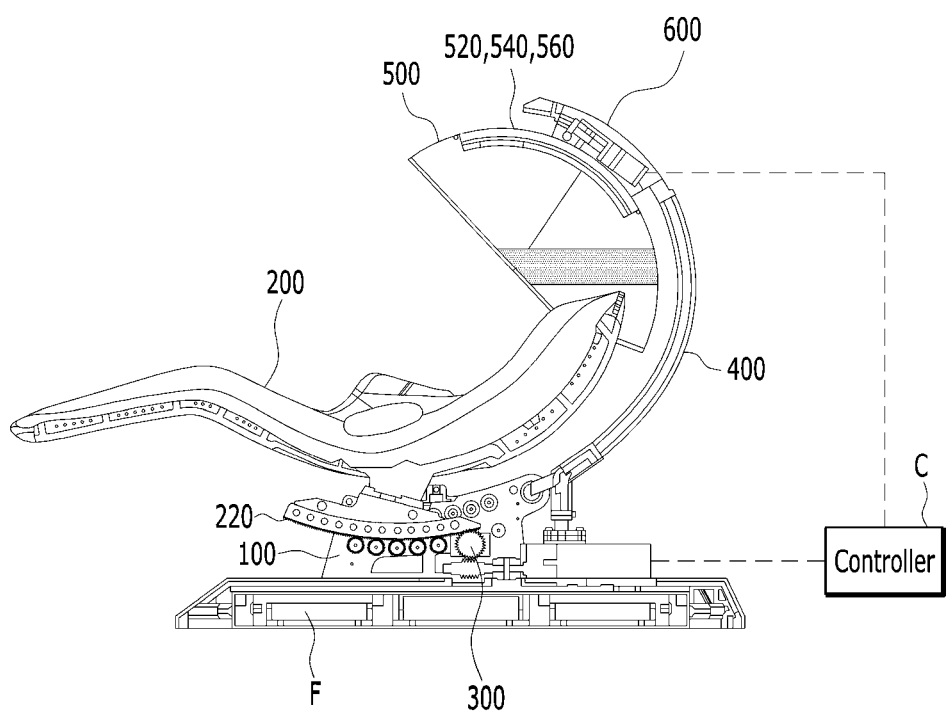
FIG. 1 and FIG. 2 are views showing a process of operating a swing seat unit according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Figure 2:
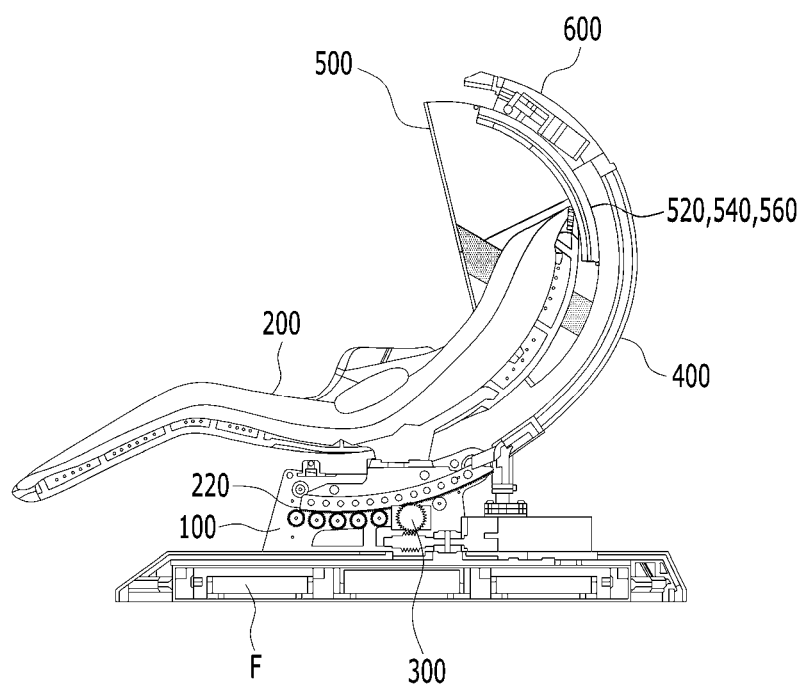
Figure 3:
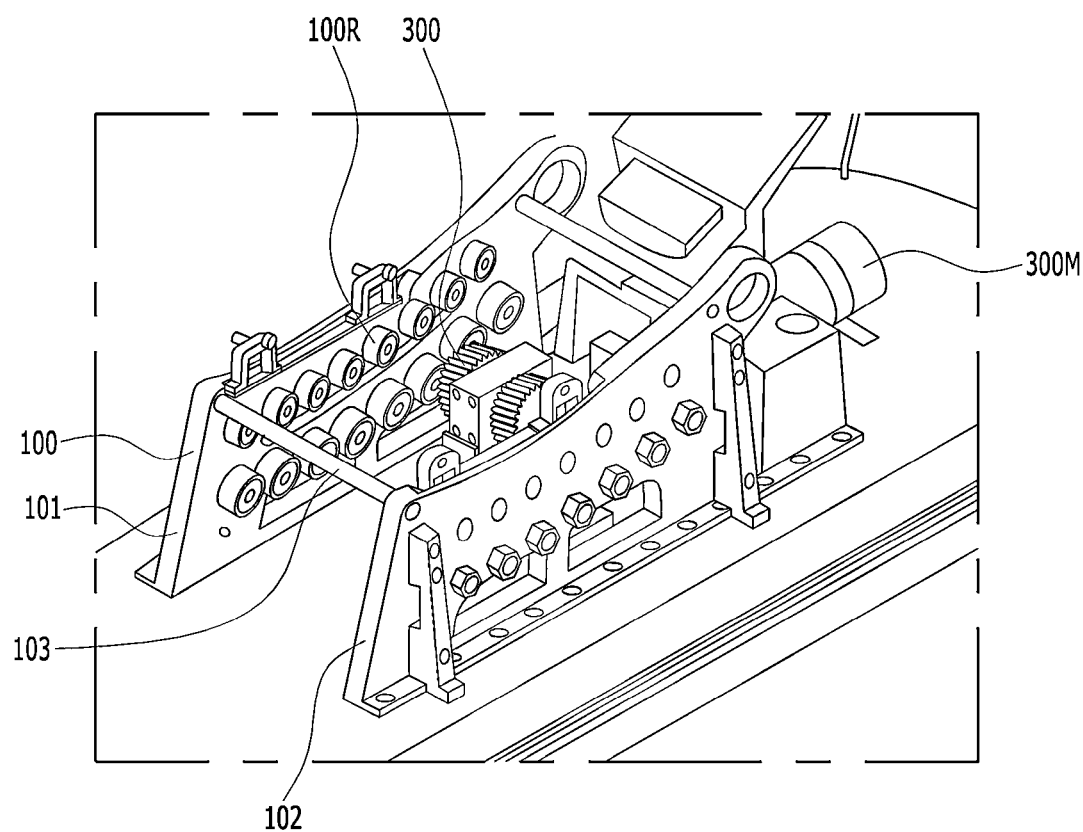
FIG. 3 is a view showing a fixing frame of a swing seat unit according to various exemplary embodiments of the present invention.
Figure 4:
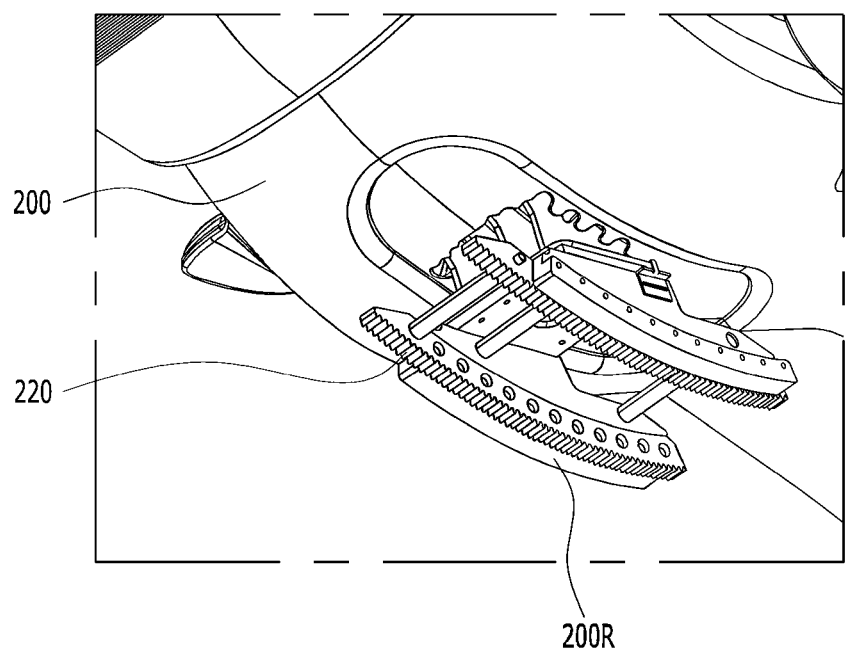
FIG. 4 is a view showing a lower portion of a swing seat unit according to various exemplary embodiments of the present invention.
Figure 5:
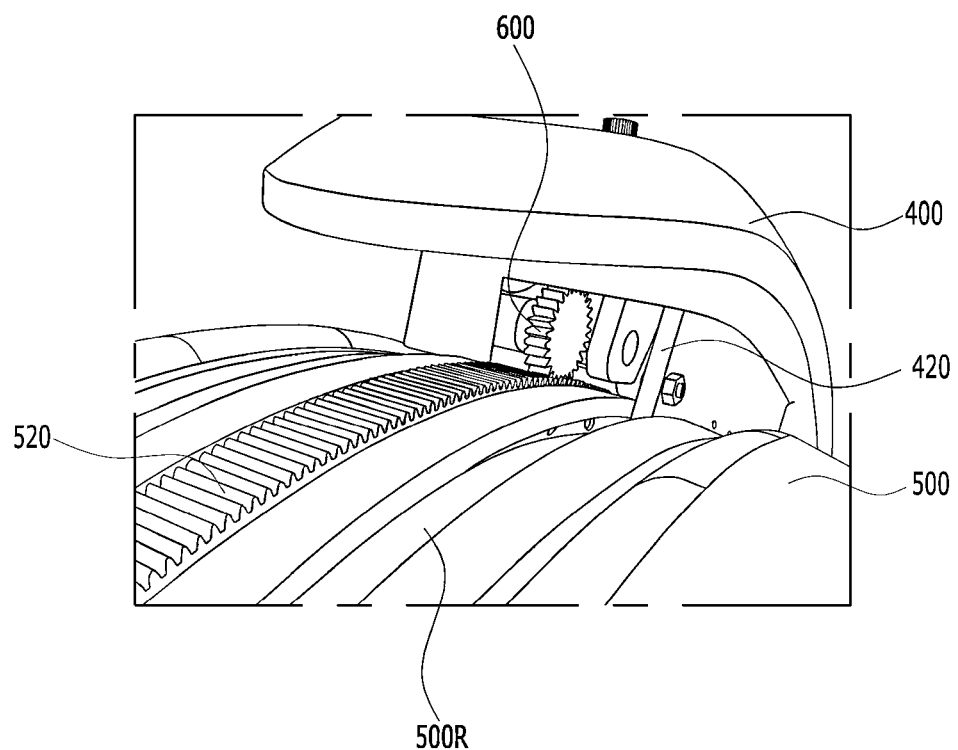
FIG. 5 is a view showing a swing dome of a swing seat unit according to various exemplary embodiments of the present invention.
Figure 6:
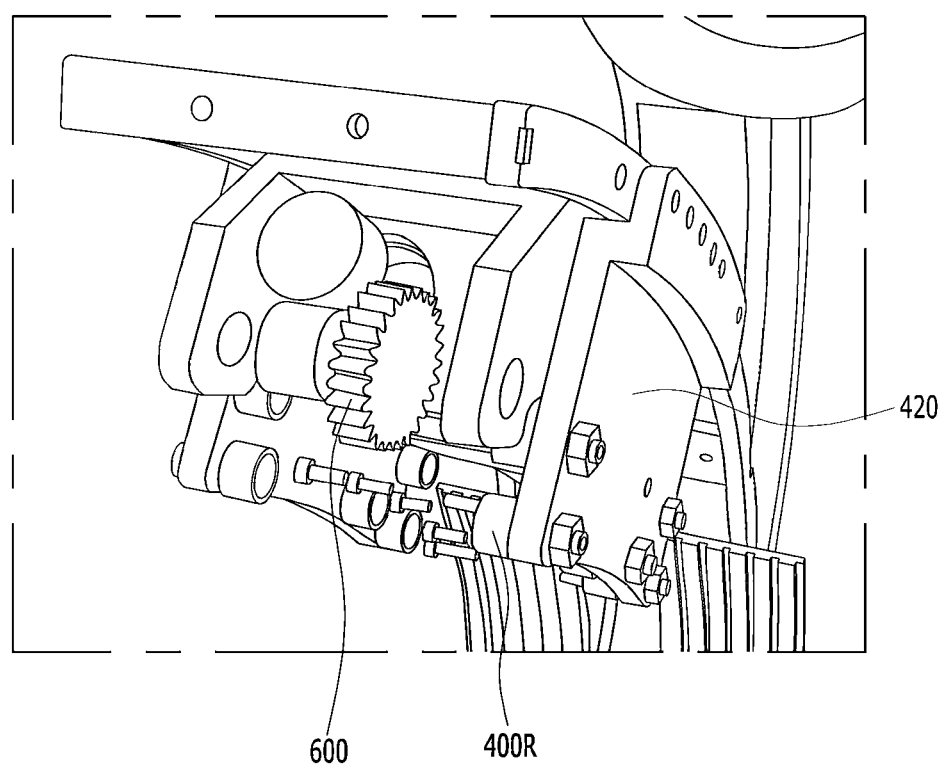
FIG. 6 is a view showing a second driving portion of a swing seat unit according to various exemplary embodiments of the present invention.
Figure 7:
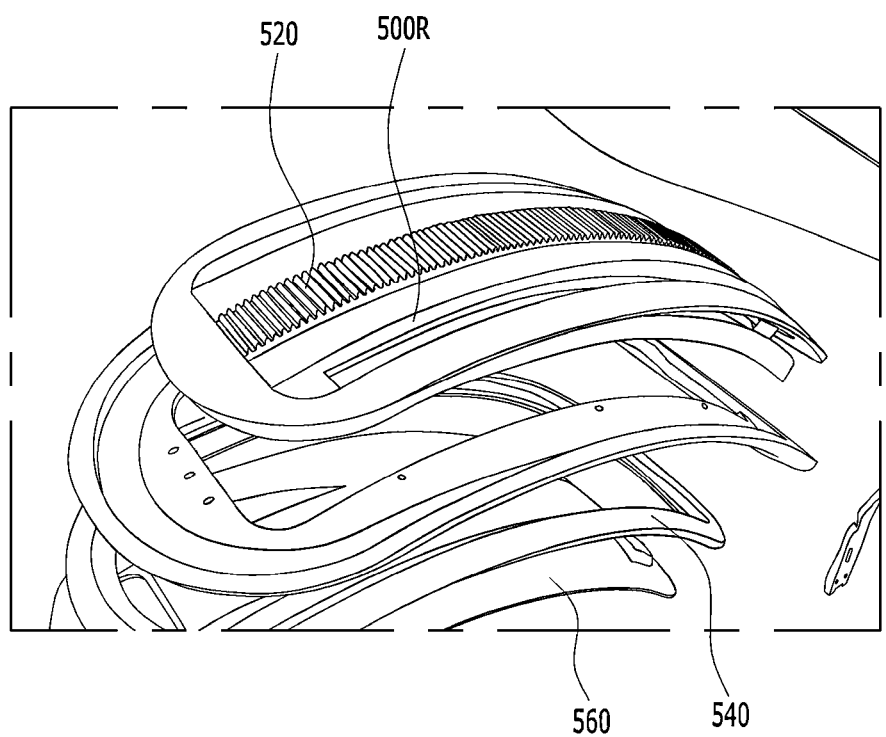
FIG. 7 is a view showing an upper portion of a swing dome of a swing seat unit according to various exemplary embodiments of the present invention.

FIG. 1 and FIG. 2 are views showing a process of operating a swing seat unit according to various exemplary embodiments of the present invention, FIG. 3 is a view showing a fixing frame of a swing seat unit according to various exemplary embodiments of the present invention, FIG. 4 is a view showing a lower portion of a swing seat unit according to various exemplary embodiments of the present invention, FIG. 5 is a view showing a swing dome of a swing seat unit according to various exemplary embodiments of the present invention, FIG. 6 is a view showing a second driving portion of a swing seat unit according to various exemplary embodiments of the present invention, FIG. 7 is a view showing an upper portion of a swing dome of a swing seat unit according to various exemplary embodiments of the present invention.

FIG. 1 and FIG. 2 are views showing a process of operating a swing seat unit according to various exemplary embodiments of the present invention. The seat 200 in various exemplary embodiments of the present invention is constituted of one piece by integrating a seat cushion and a seat back on which an occupant sits. Therefore, although it is difficult to adjust the relative angle between the seat cushion and the seat back, swing movement such as erecting or lying down on the seat 200 itself is possible. Thus, the seat 200 may be adjusted to a desired angle by a seated occupant.

Therefore, through such a seat structure of the present invention, there is advantage of eliminating the need to design a complex mechanism for the manufacture of the seat, reducing weight, and lowering the price. Furthermore, if the angle or shape of the seat back and the seat cushion is basically designed as ergonomically as possible, it is difficult to change the relative angle, so rather, it maintains a comfortable posture as much as possible by inducing the seated occupant to always sit in a correct posture.

In general, when a person sits on a chair, there is an optimal seat cushion and seatback angle that can feel like weightlessness. In various exemplary embodiments of the present invention, by fixing the angle between the seatback and the seat cushion, the seated person can feel as much weightless as possible in most of the swing angle area when the seat 200 itself swings.

In the conventional seat, even if the angle of one of the seat cushion and the seat back is changed, the seat back and the seat cushion are basically connected by a link, so that there is no choice but to feel a uncomfortable feeling, and the posture of the seat to feel comfortable is limited. On the other hand, in various exemplary embodiments of the present invention, since the seat 200 constituted of one piece is swinging in place, the range of angles at which the seated occupant can feel comfortable is increased, and the effort to find such operation or posture is reduced.

FIG. 1 illustrates a case where a seated occupant swings the seat 200 clockwise in a slightly lying position for relaxation, and in the instant case, a swing dome 500 is also swinging forward, that is, counterclockwise, which represents a movement that makes it possible to cover the head of the seated occupant.

FIG. 2 shows a case where the seat 200 is erected, and in the instant case, the swing dome 500 interlocks and rotates clockwise so as not to obstruct the front view of the seated occupant.

That is, when the movement of the seat 200 and the movement of the swing dome 500 are interlocked, the swing direction of the seat 200 and the swing direction of the swing dome 500 are different from each other, which provides a comfortable rest environment by sufficiently covering the head of the seated occupant in a relaxation mode, and it enables to prevent the swing dome from obscuring a front view in a seating. It will be understood that the seated occupant can individually operate the seat and the swing dome through a separate switch or the like.

To the present end, the swing seat unit according to various exemplary embodiments of the present invention includes a fixing frame 100; a seat 200 which is provided on the fixing frame 100 and swings on the fixing frame 100; a first driving portion 300 which is provided between the fixing frame 100 and the seat 200 and provides power for swinging the seat 200; a dome frame 400 which is provided to be spaced from the rear of the seat 200 and extends upward to surround the rear of the seat 200; a hemispherical swing dome 500 which is provided on an upper portion of the dome frame 400, swinging on the dome frame 400, and opened downward toward the head of a seated occupant of the seat 200; and a second driving portion 600 which is provided between the dome frame 400 and the swing dome 500 and provides power for swing the swing dome 500.

The seat 200 in various exemplary embodiments of the present invention is configured by integrating a seat cushion and a seat back, and the seat 200 is provided on the fixing frame 100 at the lower portion. The fixing frame 100 may be provided on the indoor space floor F, support the seat 200, and allow the seat 200 to be swingable.

The first driving portion 300 is provided between the fixing frame 100 and the seat 200. The first driving portion 300 provides power for swinging the seat 200. The seat 200 provides the movement corresponding to the concept of swing rather than the concept of reclining, and for the present purpose, the first driving portion 300 is provided between the fixing frame 100 whose position is fixed at the lower portion and the seat 200 swinging above the fixing frame. Accordingly, the seat 200 is supported by the fixing frame 100 and at the same time performs a swing motion on the fixing frame 100 through the first driving portion 300.

Furthermore, the dome frame 400 is provided at a position spaced from the rear of the seat 200. The dome frame 400 corresponds to a frame extending upward to surround the rear of the seat 200. Furthermore, in the case in which the lower portion of the dome frame 400 is integrated with the fixing frame 100, the dome frame 400 has a simple configuration and does not take up a lot of space inside a vehicle.

The dome frame 400 surrounds the rear of the seat 200 and extends upward in a state in which the lower portion is integrated with the fixing frame 100. Because the seat 200 swings inside the dome frame 400, the rear of the seat 200 has a curvature, and the dome frame 400 is also designed to have a corresponding curvature so that when the seat 200 swings, the dome frame 400 stably covers the seat 200 and does not interfere with the swing movement.

Furthermore, the swing dome 500 is provided on the upper portion of the dome frame 400, swings on the dome frame 400, and has a hemispherical shape which is opened downward toward the head of the seat occupant. The swing dome 500 surrounds a portion of the head of the seated occupant and covers it, so that the seat 200 is used as a sufficiently personalized space even when the seated occupant boards a vehicle with other people or is in the same space and provides a personalized feeling. Accordingly, a personal display, personal lighting, personal speaker, etc. may be provided on the dome frame 400, and furthermore, personal air conditioning and safety systems such as airbags may be provided.

Furthermore, the swing dome 500 is interlocked with the seat to be configured to swing on the dome frame 400 as well as individually and independently to swing. Therefore, for the present purpose, the second driving portion 600 is provided between the dome frame 400 and the swing dome 500 to provide power for swing the swing dome 500.

Since both the seat 200 and the swing dome 500 need to be supported and at the same time cause a swing motion that moves circularly with respect to the rotation center, the external surface of the supported portion needs to be designed to have a certain curvature. Thus, the first driving portion 300 and the second driving portion 600 drives a rack gear having such a curvature so that the swing movement of the seat 200 and the swing dome 500 can occur.

A control portion C controls the first driving portion 300 and the second driving portion 600 together or independently. Accordingly, the control portion C controls the first driving portion 300 and the second driving portion 600 to be interlocked as shown in FIG. 1 and FIG. 2. Thus, in a relaxation mode as shown in FIG. 1, the swing dome covers the seated occupant's gaze so that a sufficient rest is possible, and in the normal mode as shown in FIG. 2, the swing dome does not overly obscure the front gaze of the seated occupant. That is, the control portion C can control the first driving portion 300 and the second driving portion 600 such that when the seat 200 is swing in the erect direction thereof, the open portion of the swing dome 500 faces forward, and when the seat 200 is swing in the lying direction thereof, the open portion of the swing dome 500 faces downward.

It will be understood that, even in the instant state, the control portion C may independently control the first driving portion 300 and the second driving portion 600 so that the seated occupant can individually swing the seat 200 and the swing dome 500.

Meanwhile, at least one of a lighting 540 or a speaker 560 may be provided on the swing dome 500.

FIG. 7 is a view showing the upper portion of the swing dome 500 of the swing seat unit according to various exemplary embodiments of the present invention. The speaker 560 is disposed at a position inclined forward from the upper portion of the swing dome 500, and can output sound toward the internal space of the swing dome 500.

The lighting 540 or the speaker 560 may be provided on the upper portion of the swing dome 500 as shown in FIG. 7. Furthermore, the lighting 540 or the speaker 560 is provided to overlap the area where a dome rail 520 is provided, minimizing the area occupied by the entire fixtures and securing a sufficient view.

The swing dome 500 may include a transparent or translucent plastic material, through which it is possible to secure a view of the seated occupant. When a transparent display function is applied, various information may be provided through the swing dome 500.

Furthermore, when the speaker 560 outputs sound toward the internal space of the swing dome 500, the sound wave is reflected from the inside of the swing dome 500 and is concentrated toward the head of the seated occupant. Thus, a sufficient sound is provided to the seat occupant of the seat 200, and noise is suppressed to the occupant of the adjacent seat 200 as much as possible. The swing dome 500 is also configured to concentrate the sound of the speaker 560, but at the same time is configured to block external noise.

FIG. 5 is a view showing the swing dome of the swing seat unit according to various exemplary embodiments of the present invention, FIG. 6 is a view showing the second driving portion of the swing seat unit according to various exemplary embodiments of the present invention.

As shown in FIG. 5 or 7, the speaker 560 is built in the upper portion of the swing dome 500, the dome rail 520 is formed in the front and rear direction on the external surface, the dome rail 520 may be connected to the second driving portion 600. Since the speaker 560 and the dome rail 520 are overlapped at one position, the area occupied by the fixtures in the swing dome 500 may be minimized. Furthermore, the dome rail 520 is a rack gear type and has a curvature and extends forwards and backwards along the external surface of the swing dome 500, implementing the swing movement of the swing dome 500.

Furthermore, the second driving portion 600 is provided on the upper portion of the dome frame 400, and the dome rail 520 extending in the front and rear directions is formed on the upper external surface of the swing dome 500. As the dome rail 520 is connected to the second driving portion 600, the swing dome 500 may swing by driving the second driving portion 600. Furthermore, on the upper external surface of the swing dome 500, a dome guide rail 500R is formed to extend in the front and rear directions toward the side of the dome rail 520, and the dome frame 400 may be disposed with a dome guide roller 400R which is combined with the dome guide rail 500R to guide the swinging of the swing dome 600.

The second driving portion 600 includes a motor and gears, and the dome rail 520 is moved forwards and backwards by driving the motor, and accordingly, the swing dome 500 moves. In the swing dome 500, the dome guide rail 500R is formed to extend in the front and rear directions and the dome guide rail 500R is formed to have a curvature as a groove shape so that the movement of the swing dome 500 may be implemented as a swing movement. Furthermore, the dome guide roller 400R is provided on a side wall 420 of the dome frame 400, and the dome guide roller 400R is caught while being inserted into the dome guide rail 500R so that the swing dome 500 is hung from the upper portion of the dome frame 400 without falling, and is stably guided during the swinging.

FIG. 3 is a view showing the fixing frame of the swing seat unit according to various exemplary embodiments of the present invention, FIG. 4 is a view showing the lower portion of the swing seat unit according to various exemplary embodiments of the present invention.

This is a configuration for implementing the swing of the seat 200 in which the first driving portion 300 is provided on the fixing frame 100, the arch-shaped rack gear 220 protruding downward is provided on the lower portion of the seat 200, and the rack gear 220 is connected to the first driving portion 300 so that the seat 200 may swing by driving the first driving portion 300. Furthermore, the arch-shaped guide rail 200R is formed on the outside of the rack gear 220, and a guide roller 100R may be provided on the fixing frame 100 along the path through which the guide rail 200R slides to guide the sliding of the guide rail 200R.

That is, the seat 200 is disposed with the arch-shaped rack gear 220 protruding downward at the rear thereof. Furthermore, the first driving portion 300 is provided on the fixing frame 100. The first driving portion 300 includes a motor 300M and gears, and the driven gear supports the rack gear 220 and simultaneously slides the rack gear 220 when rotating so that the swing of the seat occurs. To the present end, a plurality of guide rollers 100R is provided on both sides walls 101 and 102 of the fixing frame 100 along a sliding path which is formed to have a curvature, whereby the arch-shaped guide rail 200R of the seat may be naturally guided to the swing trajectory.

In an exemplary embodiment of the present invention, the sides walls 101 and 102 may be connected to each other via a connecting bar 103.

Furthermore, since the upper portion of the seat 200 is located in the internal space of the swing dome 500, a portion of the head of the seated occupant is always positioned inside the swing dome, and through this, the seated occupant can have a personalized feeling in any posture. Furthermore, it is also possible to control the swing of the seat 200 or the swing dome 500 according to the situation to change the degree to which the upper portion of the seat 200 is located in the internal space of the swing dome 500 so that the seated occupant does not feel stuffy.

According to the swing seat unit of the present invention, it may be provided a swing seat unit optimized for autonomous vehicle in which the seat is formed of one piece by reducing a plurality of frames and links forming the seat for easy implementation of a swinging structure and smooth tilting through swing movement, and in which lighting and sound is implemented and personalized through a dome shape.

Furthermore, the term related to a control device such as "control part", "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by multiple control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A swing seat unit comprising
   a fixing frame;
   a seat which is provided on the fixing frame and swingable on the fixing frame;
   a first driving portion which is provided between the fixing frame and the seat to provide power for swinging the seat;
   a dome frame which is provided at a rear of the seat and extends upward to surround the rear of the seat;
   a hemispherical swing dome which is provided on an upper portion of the dome frame, swingable on the dome frame, and is opened downward toward a predetermined direction; and
   a second driving portion which is provided between the dome frame and the swing dome to provide power for swing the swing dome.

2. The swing seat unit of claim 1, wherein the swing seat unit is provided on an indoor space floor of a vehicle.

3. The swing seat unit of claim 1, further including a control portion that is electrically connected to the first driving portion and the second driving portion and configured to control the first driving portion and the second driving portion together or independently.

4. The swing seat unit of claim 3, wherein the control portion is configured to control the first driving portion and the second driving portion so that an open portion of the swing dome faces forward when the seat is swinging in an erect direction thereof, and the open portion of the swing dome faces downward when the seat is swinging in a lying direction thereof.

5. The swing seat unit of claim 1, wherein at least one of a lighting or a speaker is provided on an upper portion of the swing dome.

6. The swing seat unit of claim 5, wherein the speaker is disposed at a position inclined forward from the upper portion of the swing dome and outputs sound toward an internal space of the swing dome.

7. The swing seat unit of claim 1, wherein the swing dome is formed with a transparent or translucent plastic material.

8. The swing seat unit of claim 1, wherein a speaker is built in an upper portion of the swing dome.

9. The swing seat unit of claim 1, wherein a dome rail is formed on the swing dome and is coupled to the second driving portion.

10. The swing seat unit of claim 1, wherein the first driving portion is provided on the fixing frame, and an arch-shaped rack gear protruding downward is provided at a lower portion of the seat, and the rack gear is engaged to the first driving portion, so that the seat swings by the first driving portion.

11. The swing seat unit of claim 10, wherein an arch-shaped guide rail is formed on an outside of the rack gear, and a guide roller is provided on the fixing frame along a path along which the guide rail slides to guide the sliding of the guide rail.

12. The swinging seat unit of claim 1, wherein the second driving portion is provided on the upper portion of the dome frame, a dome rail extending in front and rear directions is formed on an upper external surface of the swing dome, and the dome rail is engaged to the second driving portion so that the swing dome swings by the second driving portion.

13. The swing seat unit of claim 1, wherein a dome guide rail is formed on an upper external surface of the swing dome so that the dome guide rail extends in front and rear directions toward a side of the dome rail.

14. The swing seat unit of claim 13, wherein a dome guide roller is provided on the dome frame to guide the swinging of the swing dome by being engaged with the dome guide rail.

15. The seat swing seat unit of claim 1, wherein an upper portion of the seat is located in an internal space of the swing dome.

* * * * *